(12) United States Patent
Price (10) Patent No.: US 7,343,688 B2
(45) Date of Patent: Mar. 18, 2008

(54) VERSATILE ADJUSTABLE CLAMP FIXTURE AND MULTIPLE SQUARE TOOL

(76) Inventor: Daniel C. Price, 5419 Peach Tree Dr., Cambridge, MD (US) 21613

(*) Notice: Subject to any disclaimer, the term of this patent is extended or adjusted under 35 U.S.C. 154(b) by 0 days.

(21) Appl. No.: 11/388,864

(22) Filed: Mar. 24, 2006

(65) Prior Publication Data

US 2007/0220760 A1    Sep. 27, 2007

(51) Int. Cl.
*B43L 7/10*    (2006.01)
(52) U.S. Cl. ............................................. 33/452; 33/418
(58) Field of Classification Search ................ 33/418, 33/419, 427, 452, 464, 472, 473, 484, 485, 33/486
See application file for complete search history.

(56) References Cited

U.S. PATENT DOCUMENTS

| | | | | |
|---|---|---|---|---|
| 70,547 A * | 11/1867 | Graham | ........................ | 33/419 |
| 3,238,625 A * | 3/1966 | Myers | .......................... | 33/472 |
| 4,825,559 A * | 5/1989 | Santos | .......................... | 33/464 |
| 4,914,825 A * | 4/1990 | Howard | ........................ | 33/464 |
| 5,083,380 A * | 1/1992 | Robertson | ..................... | 33/485 |
| 7,178,252 B1* | 2/2007 | Belgard | ........................ | 33/472 |
| 2002/0178597 A1* | 12/2002 | Todd | ............................ | 33/484 |
| 2003/0101607 A1* | 6/2003 | Carlisle | ........................ | 33/427 |
| 2006/0090360 A1* | 5/2006 | Shapiro | ........................ | 33/473 |

* cited by examiner

*Primary Examiner*—G. Bradley Bennett
(74) *Attorney, Agent, or Firm*—Donald W. Meeker (57) ABSTRACT

An adjustable clamp fixture holds overlapping legs of L-shaped carpenter framing squares in aligned relationships in fixed or sliding relationships. Outer perpendicular legs of the squares align in various ways for a variety of measuring, marking, cutting, and jigging functions. Vertical holes in the fixture allow pivotal connection of the fixture to external surfaces and to another fixture for circular and angular functions. Rigid orthogonal interconnection of two fixtures enables rectangular functions.

14 Claims, 7 Drawing Sheets

VERSATILE ADJUSTABLE CLAMP FIXTURE AND MULTIPLE SQUARE TOOL

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to hand tools and particularly to a versatile adjustable combination clamp fixture and multiple L-shaped carpenter framing squares held by a clamp fixture, the clamp fixture receiving one leg of each square within a slot and using top and edge binding screws to align the squares and to hold the legs of the squares in the desired position within the slot or loosely adjusted to allow the squares to move relative to one another within the clamp fixture for use of the perpendicular legs of the squares for a variety of measuring, marking, and other functions.

2. Description of Related Art Including Information Disclosed Under 37 CFR 1.97 and 1.98

The square is an old and well known device. The basic square allows the user to align separate materials at a right angle for construction and for marking and measuring in straight lines or perpendicular lines. Typically, a square comes with a ninety degree angle and measurement markings. A variety of other tools are needed for caliper measurements, various angle marking and measuring, creating circles, measuring and marking various areas, and other normally specialized functions. Often specialized tools are expensive and limited in their capabilities. Prior art devices fail to provide a single inexpensive tool for performing a wide variety of functions.

U.S. Pat. No. 4,388,765, issued Jun. 21, 1983 to Dearman, is for a pipefitter's square holder that comprises a body having adjacent its side edges a plurality of ledges each of which is capable of supporting one leg of a square. Inwardly of each side edge is an abutment. A pair of clamp members is mounted on the body for movements relative to the latter and to one another between positions adjacent selected ones of the ledges, such clamp members being capable of removably clamping a square against the abutment associated with each of such ledges.

U.S. Pat. No. 4,497,119, issued Feb. 5, 1985 to Dearman, provides a pipefitter's protractor that has a pair of body members each of which is capable of supporting a welder's square. The body members are relatively rotatable about an axis so as to enable the squares to occupy any selected position of angular adjustment. The squares are supported on opposite sides of their respective body members to prevent interference between the squares during rotation of the body members.

U.S. Pat. No. 4,914,825, issued Apr. 10, 1990 to Howard, shows a squaring tool comprising a pair of squaring members with two blades, each of the two blades integrally joined together oriented at 45.degree. with respect to each other; a frame assembly defining a passage therethrough having a cross-sectional shape and size such that one of the blades of both of the squaring members are slidably receivable through the passage; and a locking and alignment mechanism for locking the squaring members in the frame assembly.

U.S. Pat. No. 3,670,418, issued Jun. 20, 1972 to Hamilton, Jr., claims an angularly adjustable square holder composed of rotatively adjustable sections or halves each adapted to detachably support a square, such as a framing square, and combining with the two squares to provide a protractor-like instrument capable of supporting the blades of the squares at different desired angles relative to one another.

U.S. Pat. No. 3,961,552, issued Jun. 8, 1976 to Graham, describes a method and means for cutting or ruling squares. The device comprises first and second flat guide members which are adapted to be positioned on the film halftone or diffusion transfer print. The first flat guide member comprises an elongated base portion and an elongated leg portion extending from one end of the base portion at a right angle thereto. The base and leg portions have inner guide edges formed thereon. The second flat guide member comprises an elongated base portion and an elongated leg portion extending from one end of the base portion at a right angle thereto. The base and leg portions of the second guide member have outer guide edges complementary to the inner guide edges of the first guide member. The base and leg portions of the second guide member also have inner guide edges provided thereon. The two guide members are used together to either rule or cut four perfect 90.degree. rules or cuts on four sides of the film halftone or diffusion transfer print.

U.S. Pat. No. 752,823, issued Feb. 23, 1904 to Cary, discloses combined calipers, T-square and a scale. The device comprises two L-shaped pieces of sheet metal having scale marks on the long legs thereof. A sheet metal loop or keeper is secured to the first L-shaped member. Either leg of the second L-shaped member may be placed inside the loop or keeper to change the device into calipers, T-square or a scale.

What is needed is a simple inexpensive versatile adjustable tool which is easy to use for a wide variety of different jobs.

BRIEF SUMMARY OF THE INVENTION

An object of the present invention is to provide a combined clamp fixture and multiple flat L-shaped carpenter framing squares overlapping and aligned within a slot in the clamp fixture for sliding or fixed usage serving as a simple inexpensive tool which is easy to use for a wide variety of different jobs.

A related object of the present invention is to provide the combined clamp fixture and carpenters squares tool with orthogonal screws through the clamp fixture either binding or guiding a leg of each of the squares on the top and edge of the squares.

A further object of the present invention is to provide vertical holes through the clamp fixture to enable pivotal attachment of one combined clamp fixture and squares tool device to an external surface or to another combined clamp fixture and squares tool device for working with circles and angles.

One more object of the present invention is to interconnect two clamp fixtures rigidly together at right angles using two or four nuts and bolts between the clamp fixture holes to create more combinations of angles of the protruding legs of the squares.

In brief, a clamp fixture has a rectangular slot therethrough with two orthogonal large diameter thumb screws contacting stacked legs of carpenter framing squares within the slot to bind or guide the tops and edges of the squares within the slot so that the squares are fixed in alignment or slide in alignment within the slot so that the squares will stay together and in alignment throughout the adjustment and use process. This prevents the user from having to manually hold the squares in the fixture and hold them together and so they will not accidentally come apart.

The squares used in the clamp fixture are arranged so that they lay flatly together, one atop the other. This allows for a more compact and easy to grasp arrangement and insures that the edges remain aligned in the same relative plane of reference, without any offset to each other. This allows the tips of the square blades forming the caliper to stay aligned in a straight line relative to each other which is necessary to take accurate measurements between two points with the outer legs of two squares in parallel alignment.

The present invention allows for the combination of one, two or three squares at a time making the system useful for an almost unlimited combination of measuring situations. Squares can be arranged to form a rectangular enclosed area for measuring and layout. Multiple clamp fixtures can be used on a single square or multiple stacked squares.

The two-point thumb screw arrangement provides positive user controlled pressure in two directions for maintaining parallel alignment of the square's edges and for clamping pressure to lock the squares surfaces firmly together so they cannot move relative to each other once set.

A single small hole through one corner facilitates the use of a nail or screw as a pivot point for marking circles adjusted to any radius using the blade of square, the corner of the square or other strip if material used in conjunction with a blade of the square The same hole may also be used to hang fixture on the wall for storage (with or without squares being attached). The holes further allow the fixtures to be firmly fixed to a workbench or the like, so that for example, the squares could be arranged and used as a jig for positioning or cutting, etc.

The fixture may be used as an aid for storage of multiple squares by keeping them hung neatly and firmly together when not in use.

An advantage of the present invention is that the clamp fixture secures and guides the squares insuring that they will stay together and in alignment throughout the adjustment and use process.

A related advantage of the present invention is that the user does not have to manually hold the squares in the fixture and hold them together and so they will not accidentally come apart.

A further advantage of the present invention is that the squares used in the fixture are arranged so that they lay flatly together, one atop the other to allow for a more compact and easy to grasp arrangement and insures that the edges remain aligned in the same relative plane of reference, without any offset to each other and further allows the tips of the square blades forming the caliper to stay aligned in a straight line relative to each other which is necessary to take accurate measurements between two points.

One more advantage of the present invention is that it allows for one to three squares at a time making the system useful for an almost unlimited combination of measuring situations.

Still another advantage of the present invention is that two clamp fixtures with squares allows the squares to be arranged to form a rectangular enclosed area for measuring and layout.

Yet one more advantage of the present invention is that the clamp fixture is designed to be used with common carpenters framing squares.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

In FIGS. 1-16, the invention comprises a combination of a clamp fixture 21 and one, two, or three flat L-shaped carpenter framing squares 30A, 30B and 30C forming a combination device for interconnecting a number of carpenter framing squares in both fixed and sliding aligned relationships between the carpenter framing squares to perform a variety of measuring, marking, and clamping functions.

Figure 1:
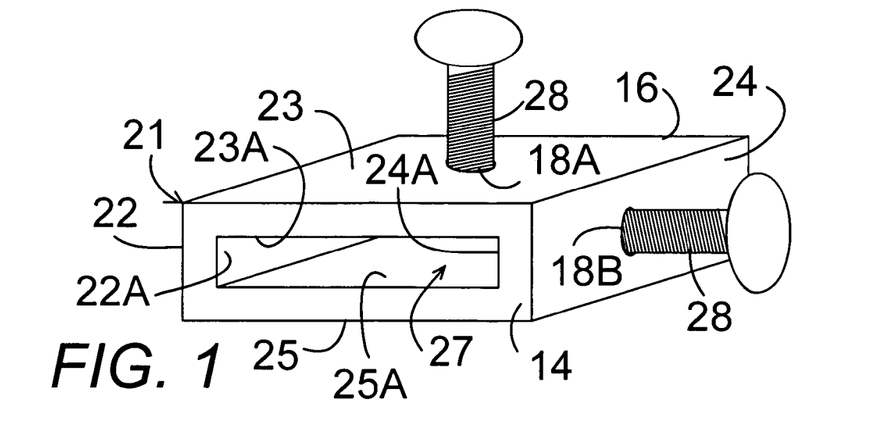
FIG. 1 is a perspective view of the clamp fixture of the present invention showing a completely enclosed rectangular casing with a center rectangular slot through the casing to receive the carpenter framing squares.
Figure 2:
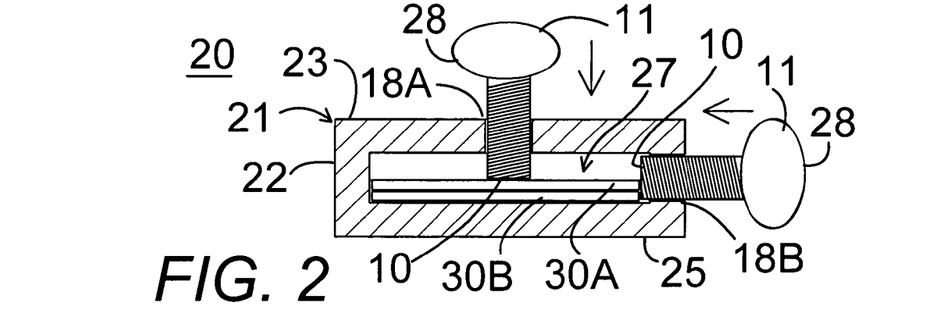
FIG. 2 is a cross-sectional view taken through the clamp fixture of FIG. 1 showing two legs of two carpenter framing squares secured by the two orthogonal thumb screws within the rectangular slot.
Figure 3:
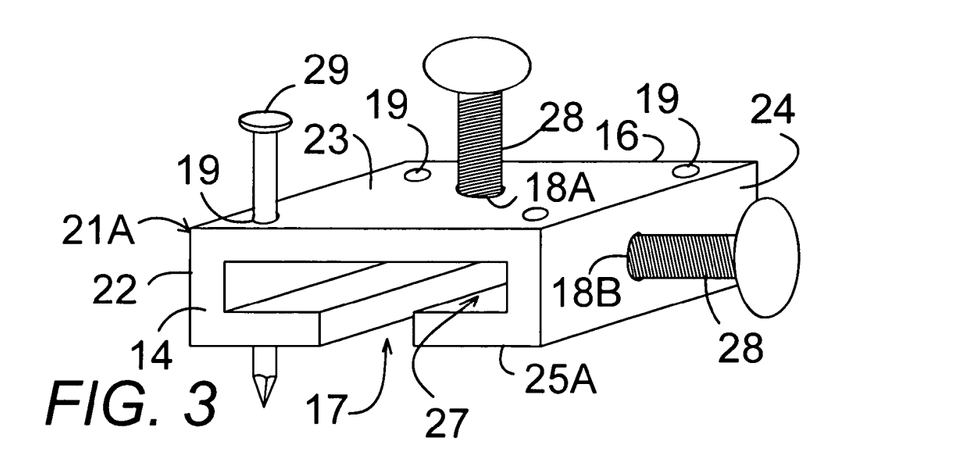
FIG. 3 is a perspective view of an alternate embodiment of the clamp fixture of FIG. 1 having a groove across the bottom surface communicating with the rectangular slot and four vertical openings through the clamp fixture adjacent to the four corners, the vertical openings not communicating with the rectangular slot and a nail inserted through one of the vertical openings for attaching the clamp fixture to an external surface for pivoting the clamp fixture and contained carpenter framing squares around the nail.

In FIGS. 1-3 a clamp fixture 21, comprising a rigid casing having a rectangular slot 27 from front a front exterior face 14 through to a back exterior face 16 is configured to receive at least one carpenter framing square that can slide within the rectangular slot 27. The rectangular slot 27 has two opposing parallel interior vertical sides 22A and 24A spaced apart by a width sufficient to receive a width of a carpenter framing square 30A, 30B, and 30C slidably fitting within the rectangular slot 27 and the rectangular slot having two opposing parallel interior horizontal surfaces, a top interior surface 23A and a bottom interior surface 25A, orthogonal to the two interior vertical sides, the interior horizontal surfaces spaced apart by a height sufficient to receive a thickness of at least three carpenter framing squares 30A, 30B, and 30C stacked together and fitting slidably within the rectangular slot.

In FIGS. 1-3 a top thumb screw 28, or other adjustable securing means attaches to the clamp fixture 21. The top thumb screw 28 threads by a first threaded shaft through a threaded opening 18A in the center of the top surface 23 and top interior surface 23A of the rectangular slot as a means for adjustably clamping the flat side of one to three carpenter framing squares 30A, 30B and 30C within the clamp fixture 27. A first end 10 of the thumb screw contacts a mid portion of a top of the flat surface of the top carpenter framing square 30A within the clamp fixture so that the bottom surface of the bottom carpenter framing square 30B contacts the bottom horizontal interior surface 25A of the rectangular slot 27 and that the carpenter framing squares 30A and 30B are alternately fixed and slidable within the rectangular slot 27 always remaining parallel to the horizontal interior top and bottom surfaces 23A and 25A of the rectangular slot 27. The thumb screw 28 has a second end 11 exterior to the clamp fixture for adjusting the thumb screw between a tight clamping mode and a looser guiding mode.

In FIGS. 1-3, a side thumb screw 28, or other adjustable securing means attaches to the clamp fixture 21. The side thumb screw 28 threads by a second threaded shaft through a threaded opening 18B in the center of a side surface 24 and interior vertical side 24A of the rectangular slot as a means for adjustably clamping the edge of one to three carpenter framing squares 30A, 30B and 30C within the clamp fixture 27. A first end 10 of the thumb screw contacts one of the edges of the carpenter framing squares carpenter framing squares 30A, 30B, and 30C contact the other of the interior vertical side 22A and the carpenter framing squares are alternately fixed and slidable within the rectangular slot 27 always remaining parallel to the interior vertical sides 22A and 24A of the rectangular slot 27. The side thumb screw 28 has a second end 11 exterior to the clamp fixture for adjusting the thumb screw between a tight clamping mode and a looser guiding mode.

These two thumb screws 28 allow adjustably clamping of the carpenter framing squares between a fixed position held securely and a second slidable position with the legs 31 and 32 of the carpenter framing squares always in alignment.

The clamp fixture 21 provides the means for adjustably clamping at least one carpenter framing square attached to the at least one clamp fixture to form a combination device for interconnecting a number of carpenter framing squares 30A, 30B and 30C to perform a variety of measuring, marking, cutting, and jigging functions.

The clamp fixture 21 further comprises (four) vertical openings 19 through an edge of the clamp fixture adjacent to but not communicating with the rectangular slot 27. A nail 29 nailed through one of the vertical openings 19 can attach the clamp fixture to an exterior surface so that the clamp fixture is rotatable around the nail to enable the rotation of at least one carpenter framing square relative to the exterior surface, as in FIG. 6.

Figure 13:
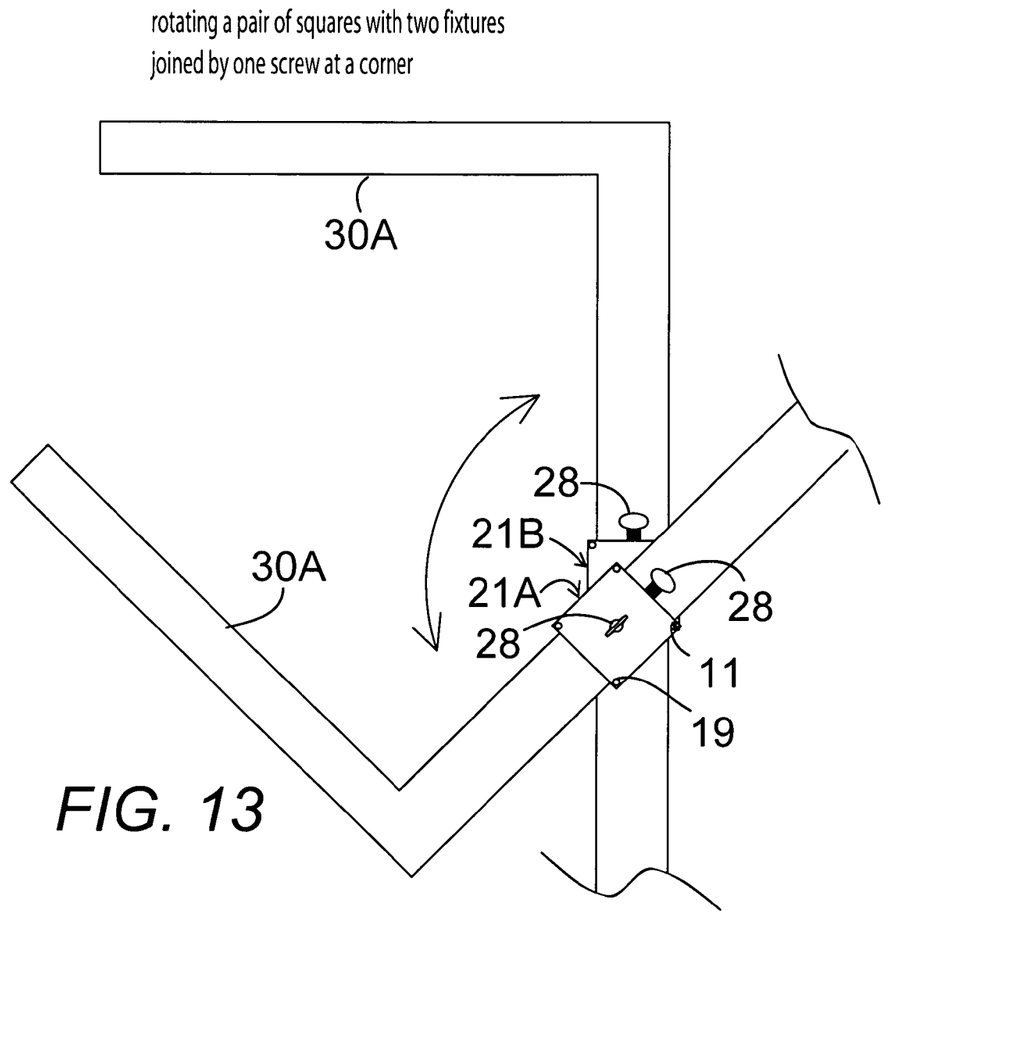
FIG. 13 is a partial plan view of two clamp fixtures rotatably joined together by a single screw and nut through a single vertical opening so the pivotable legs can be used as a guide for marking or measuring angles.

In FIG. 13, when one clamp fixture 21A is attached with a single threaded fastener 11 and a nut 12 loosely secured through a vertical opening 19 to a mating vertical opening of another clamp fixture 21B the two clamp fixtures are both independently rotatable as seen in FIG. 13 around the threaded fastener/nut 11/12 enabling the rotation of at least one carpenter framing square in each of the clamp fixtures relative to the other clamp fixture.

Figure 11:
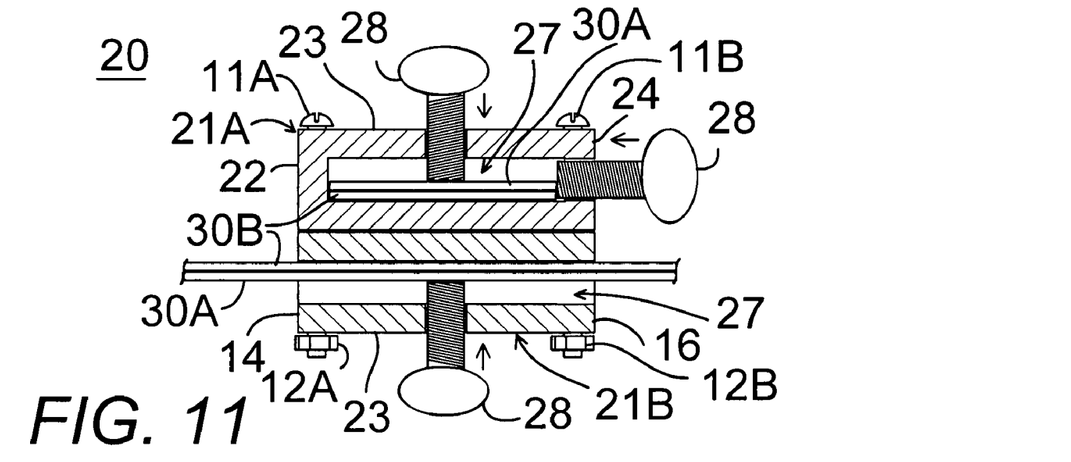
FIG. 11 is a cross-sectional view showing two clamp fixtures of the present invention secured together by screws and nuts through the vertical openings with the two clamp fixtures pivoted at right angles so that the carpenter framing squares in the clamp fixtures are pivoted at right angles.

In FIG. 11, when one clamp fixture 21A is attached by two or more threaded fasteners 11A and 11B and nuts 12A and 12B (preferably four) to a second clamp fixture 21B the clamp fixtures prevent relative rotation of the clamp fixtures and fix them rigidly together.

Figure 12:
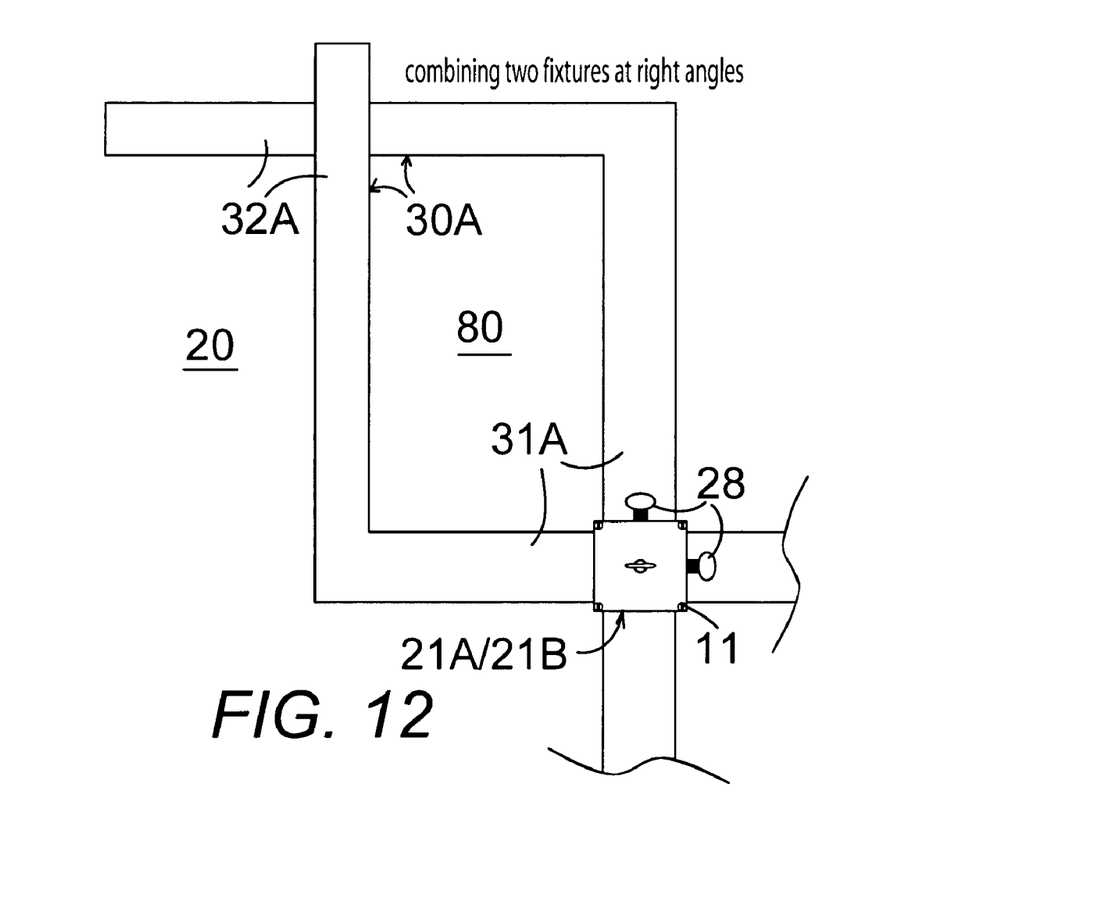
FIG. 12 is a partial plan view of the two connected clamp fixtures of FIG. 11 showing how the overlapping extending legs with their angled legs form a rectangle for measuring or marking.

In FIG. 12, an orthogonal orientation of the two attached clamp fixtures 21 fixed to each other as in FIG. 11 enables the two clamp fixtures to be interconnected with at least one carpenter tool of each clamp fixture 30A perpendicular to at least one carpenter tool of the other clamp fixture.

When at least two carpenter framing squares with a first leg 31A and 31B of each of the carpenter framing squares 30A and 30B are stacked together inside the rectangular slot and a second leg 32A and 32B of each of the carpenter framing squares is alternately arranged in any of four different alignments, as in FIGS. 4, 5, 7, 9, and 10, the interacting legs of the carpenter framing squares provides for a variety of uses in both the first fixed condition and the second slidable condition.

Figure 8:
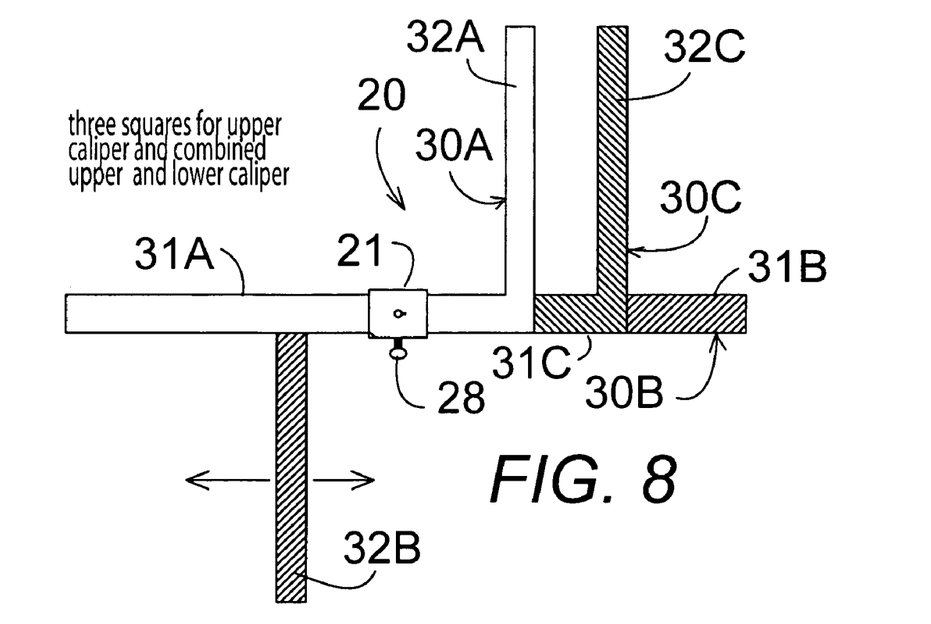
FIG. 8 is a plan view of the clamp fixture of FIG. 7 with an additional carpenter framing square stacked slidably within the clamp fixture with the outer leg parallel to the top outer leg of second carpenter framing square to form a top caliper for measuring or a parallel line marking guide between the two slidable top legs and an additional top and bottom measuring caliper or top and bottom parallel marking guide by using a top pointing leg with the bottom pointing leg of the third carpenter framing square.

In FIG. 8, the combination device 21 is comprised of at least three carpenter framing squares 30A, 30B and 30C with a first leg 31A, 31B, and 31C of each of the carpenter framing squares stacked together inside the rectangular slot 27 and a second leg 32A, 32B, and 32C of each of the carpenter framing squares alternately arranged in any of sixteen different alignments providing for a variety of uses in both the first fixed condition and the second slidable condition.

In FIGS. 13-16, with multiple clamp fixtures 21A and 21B combined in various ways with the carpenter framing squares 30A, 30B, and 30C more uses are possible.

Figure 4:
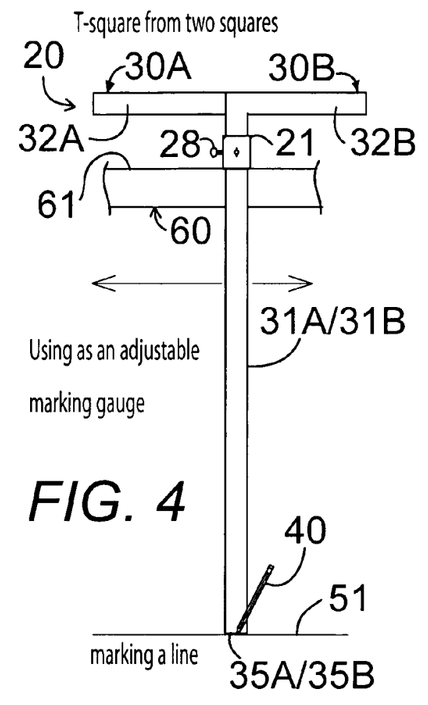
FIG. 4 is a plan view of the clamp fixture of the present invention with two carpenter framing squares locked into the clamp fixture to form a T-square configuration with the clamp fixture sliding along an external board or other object and the ends of the squares used to mark a line parallel to the board a set distance measured along the leg of the square clamped in the clamp fixture at a set distance from the end of the square thereby using the invention as an adjustable marking gauge marking a line.

In use, in FIG. 4 the clamp fixture 21 has two carpenter framing squares 30A and 30B locked into the clamp-fixture 21 to form a T-square configuration with the clamp fixture sliding along an edge 61 of an external board 60 or other object and the ends 35A and 35B of the squares on the legs 31A/31B in the clamp fixture 21 used with a pencil 40 resting on the ends 35A/35B to mark a line 51 parallel to the board a set distance measured along the leg 35A/35B of the carpenter framing square(s) 30A and 30B clamped in the clamp fixture 21 at a set distance from the ends 35A/35B of the legs 31A and 31B.

Figure 5:
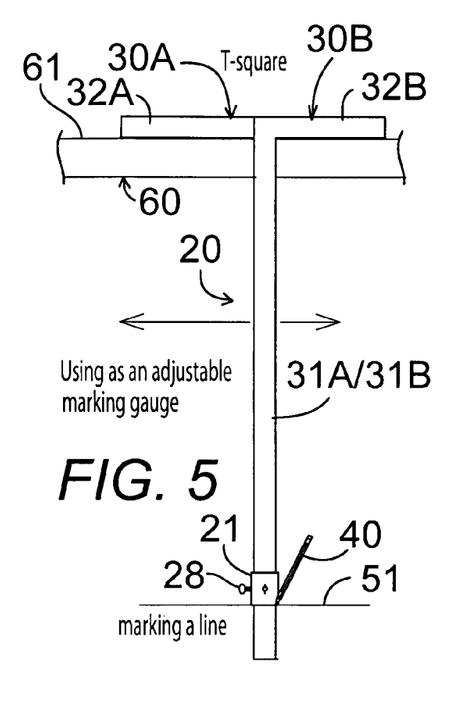
FIG. 5 is a plan view of the clamp fixture of FIG. 4 with the cross legs of the T-square configuration aligned with the board and the clamp fixture a set distance away used to draw a line parallel to the board thereby using the invention as an adjustable marking gauge marking a line.

In FIG. 5, the cross legs 32A and 32B in the T-square configuration are aligned with the edge 61 of the board 60 and the clamp fixture 21 is set at a desired distance away from the cross legs 32A and 32B and the clamp fixture 21 is used to draw a line 51 with a pencil 40 parallel to the edge 61 of the board 60.

Figure 6:
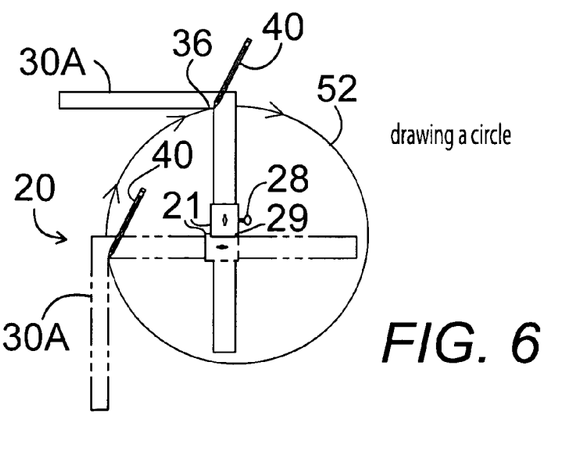
FIG. 6 is a plan view of a clamp fixture of the present invention nailed to an external surface through one of the vertical holes and rotating around the nail to draw a circle on the external surface with a pencil in the inside elbow of a carpenter framing square clamped away from the clamp fixture a distance equal to the radius of the desired circle thereby using the invention as an adjustable marking compass marking a circle.

In FIG. 6, a clamp fixture 21 of the present invention is nailed using a nail 29 to an external surface through one of the vertical holes 19, as seen in FIG. 3, and the clamp fixture 21 is rotated around the nail to draw a circle 52 on the external surface with a pencil 40 in the inside elbow 36 of a carpenter framing square 30A clamped away from the clamp fixture a distance equal to the radius of the desired circle.

Figure 7:
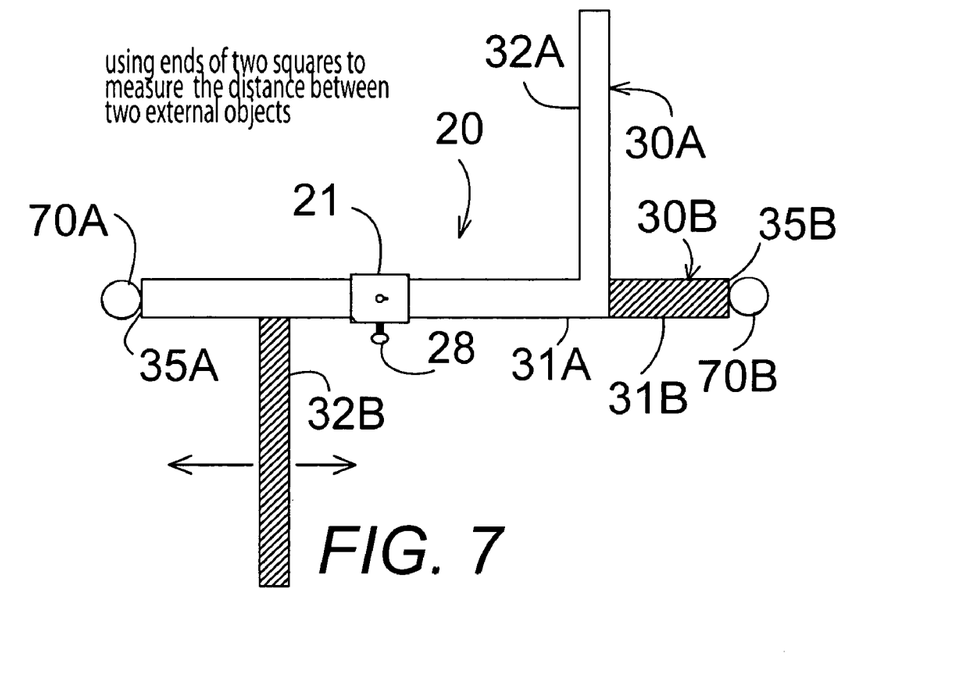
FIG. 7 is a plan view of a clamp fixture of the present invention with two carpenter framing squares slidably enclosed in the clamp fixture with the right angled legs on opposite sides of the clamp fixture pointing in opposite directions and the ends of the squares used to measure the distance between two external objects thereby using the invention as an adjustable measuring device.

In FIG. 7, a clamp fixture 21 of the present invention with two carpenter framing squares 30A and 30B slidably enclosed in the clamp fixture 21 with the right angled legs 32A and 32B on opposite sides of the clamp fixture pointing in opposite directions and the ends 35A and 35B of the slidable enclosed legs 31A and 31B used to measure the distance between two external objects 70A and 70B.

In FIG. 8, the clamp fixture 21 has three carpenter framing squares 30A, 30B and 30C stacked slidably within the clamp fixture 21 with the top outer legs 32A and 32C in a parallel sliding relationship to form a top caliper for a measuring or a parallel line marking guide between the two slidable top legs 32A and 32C and a third outer leg 30B facing down on an opposite side of the clamp fixture to form an additional top and bottom measuring caliper or top and bottom parallel marking guide by using a top outer leg 32A or 32C with the bottom outer leg 32B.

Figure 9:
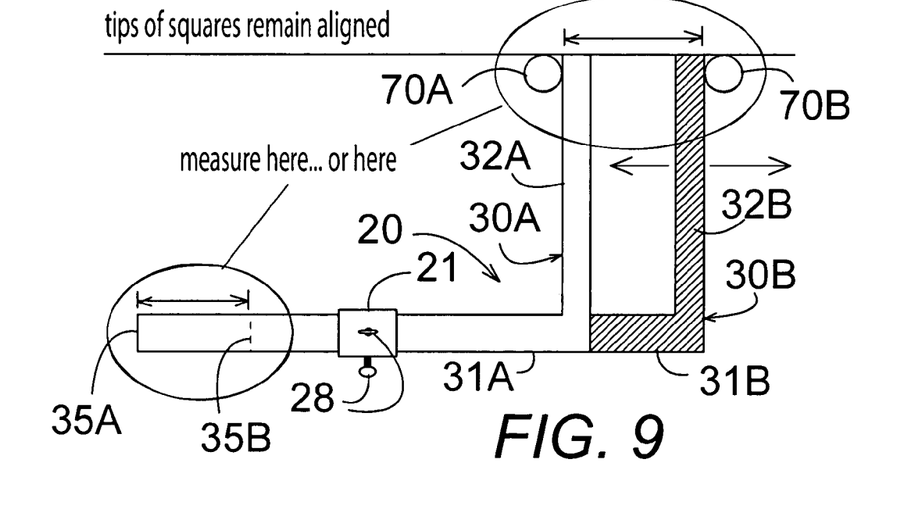
FIG. 9 is a plan view of a clamp fixture of the present invention with two carpenter framing squares slidably enclosed in the clamp fixture with the right angled legs on the same side of the clamp fixture pointing in the same direction and the parallel legs of the squares used as a top caliper for measuring the distance between two external objects which may be read by the location of an overlapping opposite end of one of the carpenter framing squares on the leg of the other thereby using the invention as an adjustable caliper measuring device.

In FIG. 9, a clamp fixture 21 has two carpenter framing squares 30A and 30B slidably enclosed in the clamp fixture 21 with the right angled outer legs 32A and 32B on the same side of the clamp fixture 21 pointing in the same direction so that the parallel legs of the squares 32A and 32B are used as a top caliper for measuring the inner distance between two external objects 70A and 70B which may be read by the location of an overlapping opposite end 35B of one of the carpenter framing squares 31B on the leg 31A of the other spaced from the end 35A.

Figure 10:
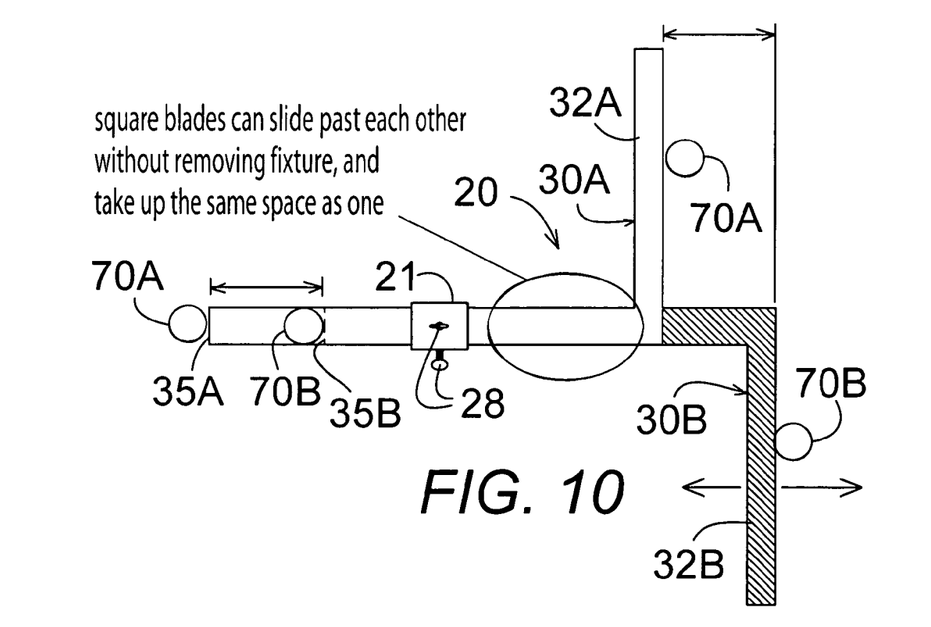
FIG. 10 is a plan view of a clamp fixture of the present invention with two carpenter framing squares slidably enclosed in the clamp fixture with the right angled legs on the same side of the clamp fixture but pointing in opposite directions and the opposing legs of the squares used as a top and bottom caliper for measuring the perpendicular distance between two non-aligned external objects which may be read by the location of an overlapping opposite end of one of the carpenter framing squares on the leg of the other thereby using the invention as an adjustable caliper measuring device.

In FIG. 10, a clamp fixture 21 has two carpenter framing squares 30A and 30B slidably enclosed in the clamp fixture with the right angled outer legs 32A and 32B on the same side of the clamp fixture but pointing in opposite directions and the opposing legs of the squares used as a top and bottom caliper for measuring the perpendicular distance between two non-aligned external objects 70A and 70B which may be read by the location of an overlapping opposite end 35B of one of the carpenter framing squares 31B on the leg 31A of the other spaced from the other end 35A.

In FIG. 11, two clamp fixtures 21A and 21B of the present invention are secured together by screws 11A and 11B and nuts 12A and 12B through the mating vertical openings 19 of FIGS. 1 and 2 with the two clamp fixtures 21 pivoted at right angles so that the carpenter framing squares 30A and 30B in the clamp fixtures are pivoted at right angles.

In FIG. 12, the two connected clamp fixtures 21A/21B, as seen in FIG. 11, show how the pair of perpendicular clamped legs 31A with their pair of perpendicular outer legs 32A form a rectangle 80 for measuring or marking with the legs in a fixed or sliding condition.

In FIG. 13, two clamp fixtures 21A and 21B are rotatably joined together by a single screw 11 and nut through a single vertical opening 19 so the pivotable legs 30A and 30B can be used as a guide for marking or measuring various angles.

Figure 14:
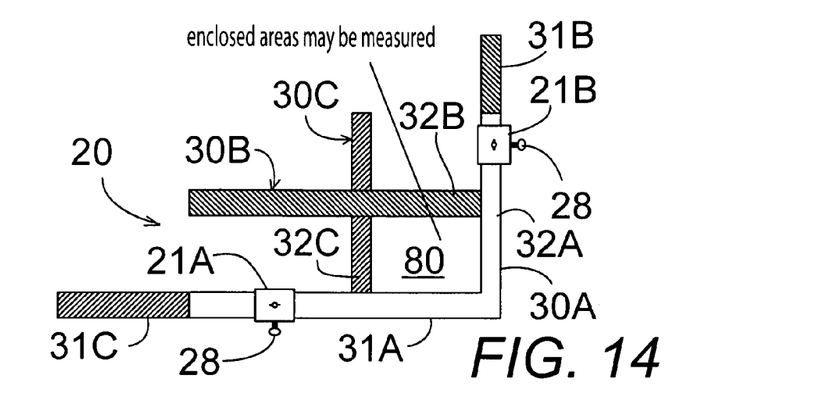
FIG. 14 is a plan view of two clamp fixtures each clamped to a different leg of the same carpenter framing square with an additional carpenter framing square in each of the clamp fixtures which can be used for measuring or marking enclosed rectangular areas.

In FIG. 14, two clamp fixtures 21A and 21B each clamped to a different leg 31A and 31B, respectively, of the same carpenter framing square 30A with an additional carpenter framing square 30B and 30C in each of the clamp fixtures can be used with the legs in a fixed condition or sliding condition for measuring or marking enclosed rectangular areas 80.

Figure 15:
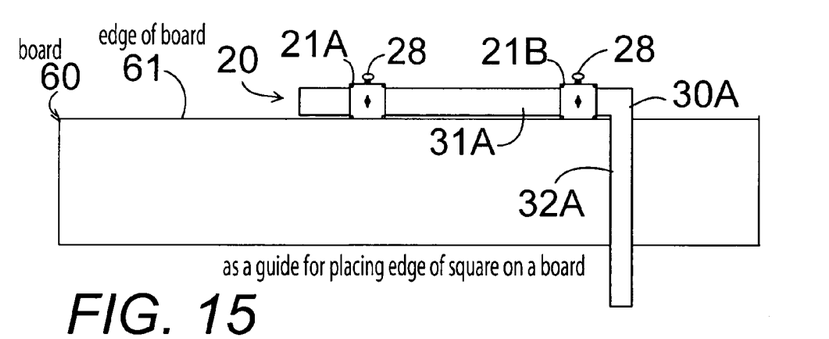
FIG. 15 is a plan view of a two clamp fixtures mounted on the same leg of a carpenter framing square used as a guide along the edge of a board for marking perpendicular lines on the board.

In FIG. 15, two clamp fixtures 21A and 21B mounted on the same leg 31A of a carpenter framing square 30A can be used as a guide along the edge 61 of a board 60 for marking perpendicular lines 51 on the board with the perpendicular outer leg 32A used as a guide.

Figure 16:
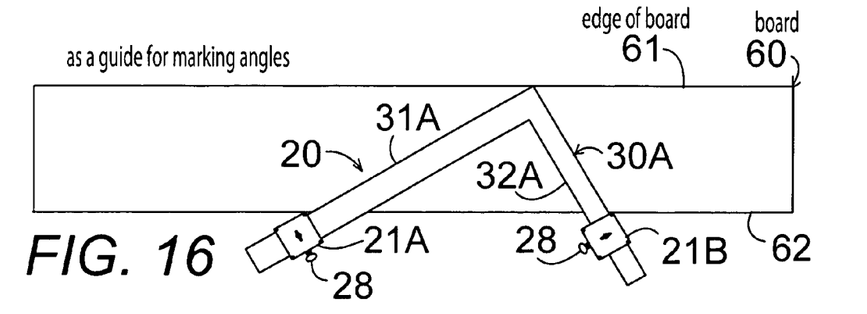
FIG. 16 is a plan view of two clamp fixtures mounted on different legs of the same carpenter framing square with the clamp fixtures used as guides along the edge of the board for marking angles on the board.

In FIG. 16, two clamp fixtures 21A and 21B are mounted on different legs 31A and 32A, respectively, of the same carpenter framing square 30A so that the clamp fixtures can be used as guides along the edge 62 of the board 60 for marking angles on the board.

It is understood that the preceding description is given merely by way of illustration and not in limitation of the invention and that various modifications may be made thereto without departing from the spirit of the invention as claimed.

What is claimed is:

1. In combination a clamp fixture and at least one carpenter framing square forming a combination device for interconnecting a number of carpenter framing squares in aligned relationships to perform a variety of measuring, marking, and clamping functions, the combination device comprising:

at least one flat L-shaped carpenter framing square;
at least one clamp fixture comprising a rigid casing having a rectangular slot therethrough from a first exterior face to a second opposing exterior face, the rectangular slot configured to receive the at least one carpenter framing square slidably within the rectangular slot, the rectangular slot having two opposing parallel interior vertical sides spaced apart by a width sufficient to receive a width of a carpenter framing square slidably fitting within the rectangular slot and the rectangular slot having two opposing parallel interior horizontal surfaces orthogonal to the two interior vertical sides, the interior horizontal surfaces spaced apart by a height sufficient to receive a thickness of at least two carpenter framing squares fitting slidably within the rectangular slot with the at least two carpenter framing squares stacked with a flat face of one of the squares in contact with a flat face of one of the other squares; a means for adjustably clamping a flat face of the at least one carpenter framing square between a first fixed condition held securely parallel to the two interior horizontal surfaces of the rectangular slot and a second slidable condition with the means for adjustably clamping a flat face of the at least one carpenter framing square guiding the at least one carpenter framing square to slide parallel to the interior horizontal surfaces of the rectangular slot, the means for adjustably clamping the flat face of the at least one carpenter framing square attached to the at least one clamp fixture; and a means for adjustably clamping an edge of the at least one carpenter framing square between a first fixed condition held securely with the edges of the at least one carpenter framing square parallel to the interior vertical sides of the rectangular slot and a second slidable condition with the means for adjustably clamping guiding the at least one carpenter framing square to slide parallel to the interior vertical sides of the rectangular slot, the means for adjustably clamping the edge of the at least one carpenter framing square attached to the at least one clamp fixture to form a combination device for interconnecting a number of carpenter framing squares to perform a variety of measuring, marking, and clamping functions;
wherein the means for adjustably clamping an edge of the at least one carpenter framing square comprises at least one second threaded shaft in a threaded opening through a center of one of the interior vertical sides, the threaded shaft having a first end contacting a first edge of the at least one carpenter framing square within the clamp fixture so that a second opposite edge of the at least one carpenter framing square remains in contact with the other of interior vertical sides of the rectangular slot and the at least one carpenter framing squares remains parallel to the two opposing interior vertical sides of the rectangular slot and the at least one second threaded shaft having a second end exterior to the clamp fixture for adjusting the threaded shaft.

2. The combination device of claim 1 wherein the means for adjustably clamping a flat side of the at least one carpenter framing square comprises at least one first threaded shaft in a threaded opening through a center of one of the horizontal interior surfaces of the rectangular slot, the at least one first threaded shaft having a first end contacting a mid portion of a top of the flat surface of the at least one carpenter framing square within the clamp fixture so that the at least one carpenter framing square contacts the other of the horizontal interior surfaces and remains parallel to the horizontal interior surfaces of the rectangular slot and the at least one first threaded shaft having a second end exterior to the clamp fixture for adjusting the threaded shaft.

3. The combination device of claim 2 wherein the at least one first threaded shaft comprises a thumb screw.

4. The combination device of claim 1 wherein the at least one second threaded shaft comprises a thumb screw.

5. The combination device of claim 1 wherein the clamp fixture further comprises at least one vertical opening through an edge of the clamp fixture adjacent to but not communicating with the rectangular slot and further comprising a means for attaching the clamp fixture to an exterior surface so that the clamp fixture is rotatable around the means for attaching the clamp fixture to an exterior surface to enable the rotation of the at least one carpenter framing square in the at least one clamp fixture relative to the exterior surface.

6. The combination device of claim 1 wherein the clamp fixture further comprises at least one vertical opening through an edge of the clamp fixture adjacent to but not communicating with the rectangular slot and further comprising a means for attaching the clamp fixture to another clamp fixture with a mating vertical opening so that the clamp fixtures are both independently rotatable around the means for attaching the clamp fixture to another clamp fixture to enable the rotation of the at least one carpenter framing square in each of the clamp fixtures relative to the at least one carpenter framing square in the other of the clamp fixtures.

7. The combination device of claim 6 wherein the means for attaching the clamp fixtures together comprises a threaded fastener smaller in diameter than the vertical openings through the clamp fixtures and a nut.

8. The combination device of claim 1 wherein the clamp fixture further comprises at least two vertical openings through an edge of the clamp fixture adjacent to but not communicating with the rectangular slot and further comprising a means for attaching the clamp fixture to another clamp fixture with at least two mating vertical openings positioned so that the clamp fixtures are fixed rigidly together in an orthogonal orientation to each other to enable the two clamp fixtures to be interconnected with the at least one carpenter tool of each of the clamp fixtures perpendicular to the at least one carpenter tool of the other of the clamp fixtures to enable the use of the at least one carpenter framing square in each of the clamp fixtures in a perpendicular orientation to at least one carpenter framing square in the other of the clamp fixtures for a variety of uses in both the first fixed condition and the second slidable condition.

9. The combination device of claim 6 wherein the means for attaching the clamp fixtures together comprises a threaded fastener and a nut through each of the at least two vertical openings to prevent relative rotation of the clamp fixtures.

10. The combination device of claim 6 wherein each of the clamp fixtures has four mating vertical openings therethrough and the means for attaching the clamp fixtures together comprises a threaded fastener and a nut through each of the four vertical openings to prevent relative rotation of the clamp fixtures.

11. The combination device of claim 1 comprising at least two carpenter framing squares with a first leg of each of the carpenter framing squares stacked together inside the rectangular slot and a second leg of each of the carpenter framing squares alternately arranged in any of four different alignments with a second leg of the other of the carpenter framing squares for a variety of uses in both the first fixed condition and the second slidable condition.

12. The combination device of claim 1 comprising at least three carpenter framing squares with a first leg of each of the carpenter framing squares stacked together inside the rectangular slot and a second leg of each of the carpenter framing squares alternately arranged in any of sixteen different alignments with a second leg of the other of the carpenter framing squares for a variety of uses in both the first fixed condition and the second slidable condition.

13. In combination a clamp fixture and at least one carpenter framing square forming a combination device for interconnecting a number of carpenter framing squares in aligned relationships to perform a variety of measuring, marking, and clamping functions, the combination device comprising:

at least one flat L-shaped carpenter framing square;

at least one clamp fixture comprising a rigid casing having a rectangular slot therethrough from a first exterior face to a second opposing exterior face, the rectangular slot configured to receive the at least one carpenter framing square slidably within the rectangular slot, the rectangular slot having two opposing parallel interior vertical sides spaced apart by a width sufficient to receive a width of a carpenter framing square slidably fitting within the rectangular slot and the rectangular slot having two opposing parallel interior horizontal surfaces orthogonal to the two interior vertical sides, the interior horizontal surfaces spaced apart by a height sufficient to receive a thickness of at least two carpenter framing squares fitting slidably within the rectangular slot with the at least two carpenter framing squares stacked with a flat face of one of the squares in contact with a flat face of one of the other squares; a means for adjustably clamping a flat face of the at least one carpenter framing square between a first fixed condition held securely parallel to the two interior horizontal surfaces of the rectangular slot and a second slidable condition with the means for adjustably clamping a flat face of the at least one carpenter framing square guiding the at least one carpenter framing square to slide parallel to the interior horizontal surfaces of the rectangular slot, the means for adjustably clamping the flat face of the at least one carpenter framing square attached to the at least one clamp fixture; and a means for adjustably clamping an edge of the at least one carpenter framing square between a first fixed condition held securely with the edges of the at least one carpenter framing square parallel to the interior vertical sides of the rectangular slot and a second slidable condition with the means for adjustably clamping guiding the at least one carpenter framing square to slide parallel to the interior vertical sides of the rectangular slot, the means for adjustably clamping the edge of the at least one carpenter framing square attached to the at least one clamp fixture to form a combination device for interconnecting a number of carpenter framing squares to perform a variety of measuring, marking, and clamping functions;

wherein the clamp fixture further comprises at least one vertical opening through an edge of the clamp fixture adjacent to but not communicating with the rectangular slot and further comprising a means for attaching the clamp fixture to an exterior surface so that the clamp fixture is rotatable around the means for attaching the clamp fixture to an exterior surface to enable the rotation of the at least one carpenter framing square in the at least one clamp fixture relative to the exterior surface.

14. The combination device of claim 13 wherein the means for attaching the clamp fixture to an exterior surface comprises a nail smaller in diameter than the vertical opening trough the clamp fixture.

* * * * *